Jan. 31, 1967 J. W. AMY ETAL 3,301,481
TEMPERATURE CONTROL SIGNAL PROGRAMMER
Filed Jan. 29, 1964 2 Sheets-Sheet 2
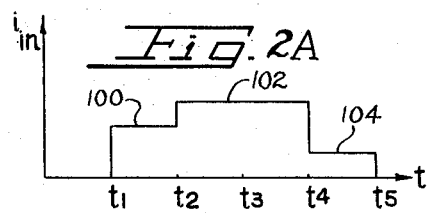
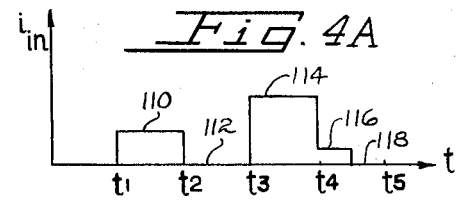
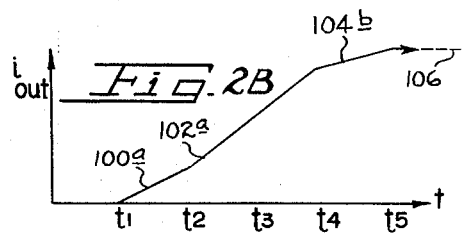
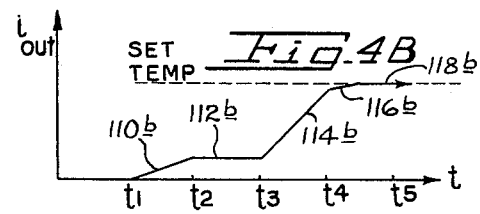
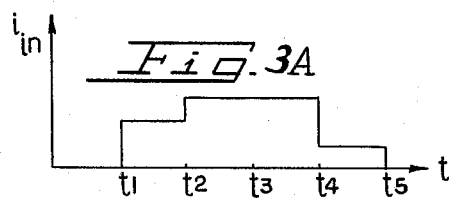
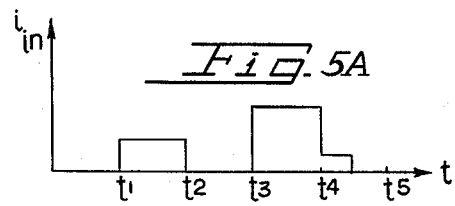
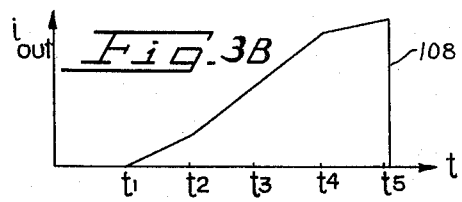
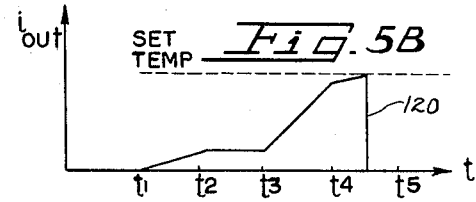
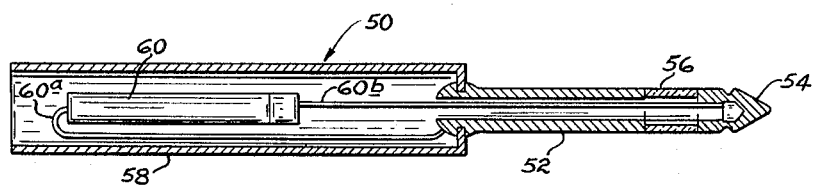
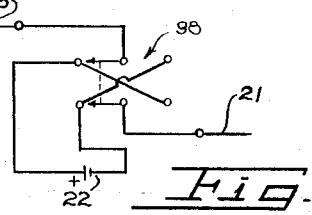
INVENTORS
JONATHAN W. AMY
LEO H. SODERHOLM
BY
Townsend and Townsend
ATTORNEYS United States Patent Office 3,301,481
Patented Jan. 31, 1967

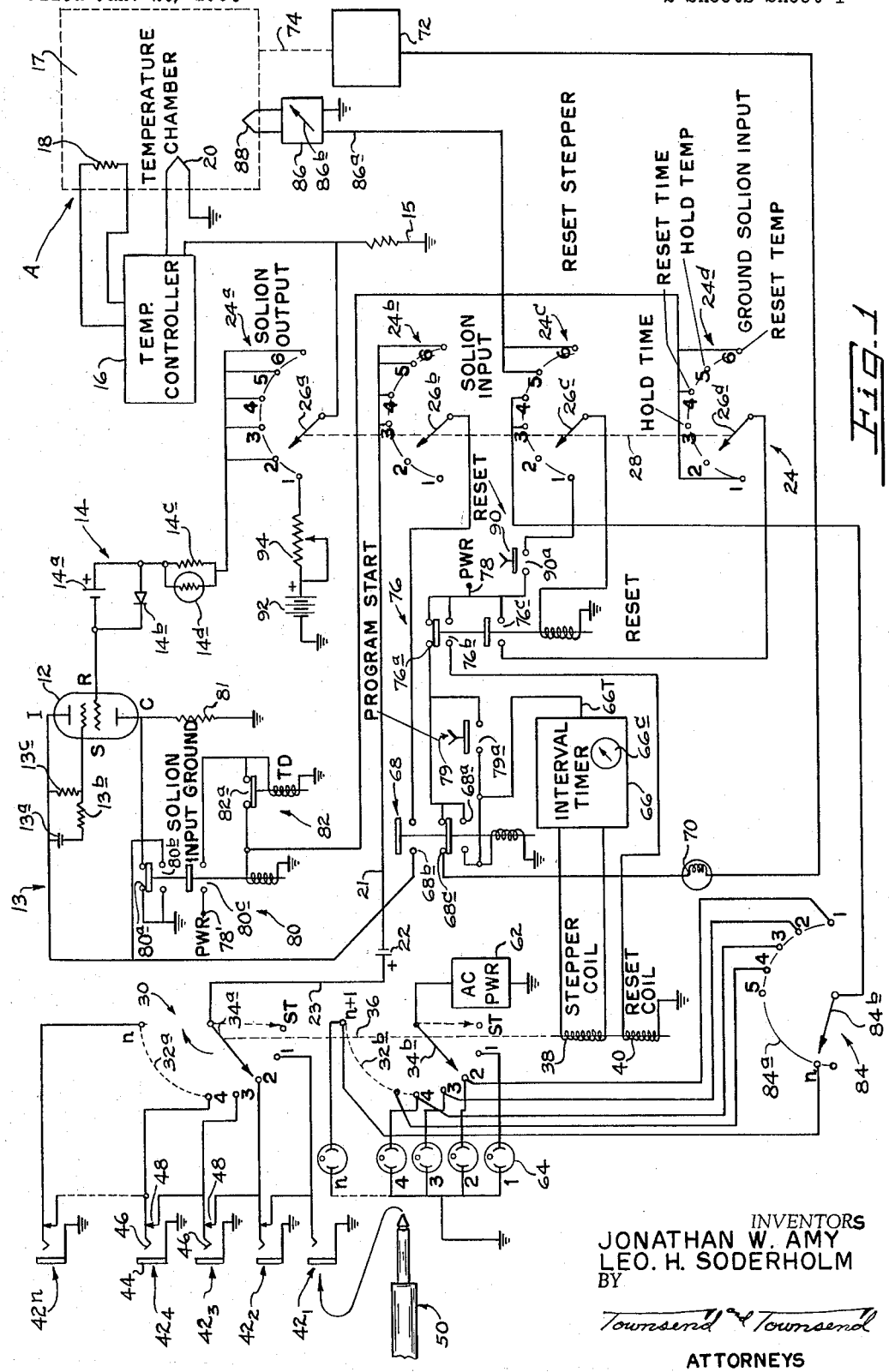

3,301,481
TEMPERATURE CONTROL SIGNAL
PROGRAMMER
Jonathan W. Amy, West Lafayette, Ind., and Leo H. Soderholm, Lafayette, Calif., assignors, by mesne assignments, to Varian Aerograph, a corporation of California
Filed Jan. 29, 1964, Ser. No. 340,869
12 Claims. (Cl. 236—46)

This invention relates to a control programmer for generating signals having a controlled time-magnitude relationship.

The object of this invention is to provide an apparatus in which an electrical signal varies in magnitude in respect to time and in accordance with the controllable program in such a way as to be useful in the control of ovens used in gas chromatography, fermenters in breweries, heat treating devices, power stations, crystal furnaces and the like.

It is a further object of the invention to provide control electrical signals which increase or decrease at a controllable rate to establish temperature set points for the operating ovens. Such systems find useful application in gas chromatography where, for example, a sample to be analyzed is subjected to an environment of controlled temperature and temperature change rate to vaporize sequentially various elements of a sample.

The control signal afforded in the present invention is formed by the use of a current integrator, such as a solion, operable to integrate with respect to time selected current signals fed to it to cause the solion to generate a "read" or output current that is a time integral of the input or "write" current. The selected "write" or input current is developed by switching apparatus connected so as to vary selectively the current input to the solion in which apparatus the switching rate and current changes are controllable to obtain a high degree of flexibility in read current changes as to both value and rate. The current or voltage changes afforded by the device are then employed in combination with a temperature chamber and conventional temperature control devices which provide a temperature output that is an analogue of the current or voltage applied at the input of the temperature control device.

A feature and advantage of this invention lies in the fact that there is a time-magnitude relationship provided which can be preselectively varied to afford a wide variety of modes of operation to obtain many time related temperature environments necessary for performing complex processes. This feature and advantage is implemented by providing a device for integrating a write current with respect to time and providing means to automatically alter the write current at variable preselected time intervals. Each time the write current is altered, the time rate of change of output read current is altered. Because magnitude of the read current determines the set point of the temperature controller, chamber temperature varies with the read current signal.

Still another object of this invention is to provide a programming circuit in which the program is automatically and rapidly interrupted or terminated upon attainment of a preselected condition, with the further provision of means for resetting the program after either a preselected time or after attainment of a preselected temperature is effected.

Still another object of the invention is to provide a programmer which generates a signal that changes at a particular rate for a given time interval and then changes at another rate for a subsequent time interval, so that both the magnitude of temperature and the rate of change of temperature in the chamber are controllably varied.

A further object is to provide a programmer wherein one of a wide variety of time-magnitude relationships can be established with great rapidity. Such object is implemented by providing a control panel having a plurality of jacks and a stepping switch, or the like, for sequentially connecting at timed intervals each of the jacks to the integrator input through a suitable voltage source. A plurality of plugs, each containing a resistor of preselected value and insertable into the jacks, is provided for determining the magnitude of integrator input current during the interval that a given plug containing jack is connected by the stepping switch to a suitable voltage source, such as a battery. Thus interchanging plugs of different resistance values affords rapid selection of a desired program.

A still further object is to provide interconnections between the jacks so that upon connection of the stepping switch to a jack having no plug therein, the value of resistance in a plug in the preceding jack will determine the integrator input current. Achievement of this object makes possible the production of integrator input current that is constant over two or more time intervals by merely omitting plugs from the requisite number of jacks succeeding a jack having the appropriate resistance therein. Therefore, constant input current can be provided for two more intervals without the necessity of matching two or more resistances.

These and other objects will be more apparent after referring to the following specification and accompanying drawings in which:

FIGURE 1 is a schematic circuit diagram of the preferred embodiment of the present invention;

FIGURES 2a and 2b are graphs of integrator input and output current, respectively, versus time in the "programmed signal followed by constant level output after preselected elapsed time" mode of system operation;

FIGURES 3a and 3b are graphs of integrator input and output current, respectively, versus time in the "programmed signal followed by reset after preselected elapsed time" mode of system operation;

FIGURES 4a and 4b are graphs of integrator input and output current, respectively, versus time in the "programmed signal followed by constant level output after preselected temperature is attained" mode of system operation;

FIGURES 5a and 5b are graphs of integrator input and output current, respectively, versus time in the "programmed temperature increase followed by reset to zero after attainment of preselected temperature" mode of system operation;

FIGURE 6 is a view in cross-section of a plug containing a resistance value for establishing write current magnitude in accordance with the present invention; and FIGURE 7 is a schematic view of a reversing switch for changing polarity of write current.

In the present invention various resistance values are used to vary the current input through switching operations to a current time integrator or solion 12, the integrated current output of which is applied to a temperature controller and furnace apparatus indicated at A. The time integrator or solion 12 is described in U.S. Patent No. 3,021,482 and changes output resistance in proportion to the polarity and magnitude of its current input (hereinafter referred to as "write" current) and in proportion to the time interval during which the current is employed. An output current is thus obtainable from the solion (hereinafter referred to as "read" current) by the provision of a constant voltage applied to the device.

Solion 12 more specifically is provided with an input biasing network 13 to provide the shield voltage which includes a battery 13a and resistors 13b and 13c which function to drop the voltage of the 1.34 volt battery to the required .3 to .5 voltage range. The output circuit 14 employs a constant potential source, such as battery 14a. Temperature compensation of the circuit can be obtained by the addition of resistor 14c shunted by a thermistor 14d, as indicated. The solion read current is partially conducted through a resistor 15 to ground, the remaining current being diverted to control a temperature controller 16 of furnace apparatus A. Temperature controller 16 establishes a temperature in furnace 17 by adjusting the furnace power level in a heater coil 18 in response to the differential between the output of a thermocouple 20, within chamber 17, and the read current from solion 12. Thus, the controller functions to maintain an accurate temperature condition, the value of which is determined by the input current applied from the solion. A battery 22, which provides the write current, is arranged through conductor 21 to connect solion terminal I with control resistors, to be hereinafter explained, of variable value through line 23 to establish the magnitude of input or write current. The resistance between battery 22 and the solion determines the write current which establishes the rate of change of the solion read current.

A multi-bank selector switch 24 is provided to permit selection of one of a plurality of modes of operation of the apparatus. The selector switch includes fixed contact banks 24a, 24b, 24c, and 24d, each bank having associated therewith a moving contact 26a, 26b, 26c, and 26d, respectively, for selectively contacting each of six fixed contacts in the banks. For convenience of description, the fixed contacts are numbered 1 through 6, inclusive. Each of moving contacts 26a, 26b, 26c, and 26d is connected to a common shaft 28 which shaft is accessible to the operator of the apparatus. In any one of the six positions of the shaft each moving arm will contact a fixed contact in the bank associated therewith having common numerical designation.

A conventional stepping switch 30 is provided to afford automatic and sequential altering of the magnitude of the write current to solion 12 by connecting the input circuit of the solion to various jacks. Stepping switch 30 includes two banks of fixed contacts 32a and 32b and a pair of wiper arms 34a and 34b, which arms sequentially contact the individual fixed contacts of the respective banks. Wiper arms 34a and 34b are attached for the rotation to a common shaft 36 which shaft is driven in a conventional manner by a stepper coil 38 to advance the wiper arms one step each time the stepper coil is energized. Also associated with shaft 36 is a reset coil 40 which when energized returns the shaft to a start position. Fixed contacts designated ST represent the start position of stepping switch 30.

Wiper arm 34a is connected to the positive terminal of battery 22. Each of the fixed contacts 32a is connected to a jack 42, the reference character for each jack having a subscript indicative of the stepping switch position with which it is associated. Each jack includes a sleeve connection 44, a tip connection 46, and a contact 48 which is normally connected to tip connection 46. Continuity between contact 48 and tip connection 46 is broken when a plug is inserted into the jack. Sleeve connection 44 of each jack 42 is connected to ground, each tip connection 46 is connected to a fixed contact in stepping switch bank 32a, and each contact 48 is connected to the tip connection of the preceding jack.

Reference character 50 designates an exemplary plug for insertion into one of jacks 42. Plug 50, in accordance with conventional practice, has a conductive sleeve 52 and a conductive tip 54 insulated from one another by insulator 56. Sleeve 52 is attached to an insulative cylindrical member 58 in which a resistor 60 is mounted. The resistor has two terminals 60a and 60b, the terminals being connected to sleeve 52 and tip 54, respectively. It will be seen that insertion of a plug 50 into a jack 42 will effect connection of resistor 60 between ground and a fixed contact of stepping switch bank 32a; when wiper arm 34a contacts such fixed contact the resistance of resistor will determine the magnitude of write current supplied to input terminal I of solion 12.

Bank 32b of stepping switch 30 functions in the present embodiment to provide an indication of the rotative position of shaft 36. A power source 62 is connected to wiper arm 34b and a lamp 64 is connected to each fixed contact in bank 34b. In the exemplary embodiment of FIGURE 1, power source 62 produces a 110 v. 60 c.p.s. signal, and lamps 64 are neon bulbs. Bulbs 64 are preferably placed on a control panel for the apparatus with which are associated numerical indicia for designating the position of shaft 36, to the end that an operator of the apparatus is apprised of the rotative position of the shaft by observing which of the lamps is illuminated.

Connected to stepper coil 38 is a variable interval timer 66. Timer 66 is a conventional device which generates pulses to energize stepper coil 38 at periodic intervals; the timer may take any one of a number of forms well known in the art. Interval timer 66 is provided with a control 66c for varying the period between successive pulses, and is provided with an input terminal 66T for initiating timer operation.

Normally open contact 68a of a relay 68 is connected to timer input terminal 66T. In addition, relay 68 includes a second normally open contact 68b in series between the negative terminal of battery 22 and solion input terminal I. The relay also has normally closed contacts 68c which are connected in series with an indicator lamp 70 and a switching circuit 72 which responds to the temperature within chamber 17 through a link 74. Switching circuit 72 is adapted to close the circuit to lamp 70 when a preselected starting temperature is sensed in chamber 17, thereby providing a visual indication of system readiness.

Relay 68 is initially energized through normally closed contacts 76a of a relay 76 which contacts conduct power from a power terminal 78 to relay 68. A start push button 79 is provided for manually energizing relay 68 and has a normally open contact 79a in series with power terminal 78 and the core of relay 68. Relay 76 is energized through moving contact 26c, of which more will be explained hereinafter. The relay also includes normally open contacts 76c which are series connected with bank 24d of selector switch 24 to a solion input control relay 80.

Relay 80 has a normally closed contact 80a which grounds the common terminal of solion 12 when the solion is functioning as an integrator. A resistor 81 is connected from solion terminal C to ground and is inserted into the circuit by opening of contact 80a during resetting of the solion. Normally open contacts 80b are also included in relay 80 to ground solion input terminal I when system operation is to be reset. Relay 80 also has a normally open contact 80c which connects power from a power terminal 78 to energize the relay.

Contacts 80c are in series with normally closed contacts 82a of a time-delay relay 82. In one apparatus constructed according to the present invention, time-delay relay 82 has a 45 second time delay, by which is meant that contacts 82a open 45 seconds after energy is applied to the coil of the relay. It will thus be seen that when normally open contacts 80c are closed, the coil of time-delay relay 82 is energized and the coil of relay 80 is energized through contacts 82a. Forty-five seconds after such energization, solion 12 will have been restored to a reset condition and contacts 82a will be opened, thus releasing relay 80.

In certain modes of operation of our device, it is necessary to interrupt the temperature program after a preselected time interval. To effect such interruption of manually operated selector switch 84 is provided and has a bank of fixed contacts 84a, which are numbered I through N, and a moving contact 84b for selective connection with one of the contacts. Each of the fixed contacts 84a is connected to a fixed contact in bank 32b of the stepping switch of a number greater by one than the contact in switch 84 as a consequence of which voltage from power source 62 appears on the fixed contact of bank 84a corresponding to the preceding position of wiper arm 34b on bank 32b. Thus, depending on the position of moving contact 84b, a controlling signal for interrupting system operation is established at the end of a preselected time interval. This controlling signal is connected to fixed contacts 3 and 4 in bank 24c of selector switch 24.

In other modes of operation of the present invention system interruption is necessary on attainment of a preselected temperature within chamber 17. In order to effect such interruption we provide a control signal generating circuit 86 which responds to the temperature in chamber 17 as sensed by a thermocouple, or the like, 88. Control signal generating circuit 86 is a conventional device, well within the competence of those skilled in the art, and functions to produce a relay energizing current at its output terminal 86a when a preselected temperature is sensed by thermocouple 88. The control signal generating circuit has a manually operable selector 86b for setting the temperature at which the relay energizing current is produced. Such current is connected to fixed contacts 5 and 6 of bank 24c of selector switch 24.

Manual interruption and reset of system operation is afforded by a reset push button switch 90 which has normally open contacts 90a in series with power terminal 78 and fixed contact 1 on bank 24c of selector switch 24.

In one mode of operation it is desirable to manually control controller 16 independently of solion 12. This can be accomplished by a battery 92 in series with a rheostat 94. The rheostat is connected to terminal 1 in bank 24a of selector 24 to independently set a control current for the controller.

OPERATION

The specific embodiment shown in FIG. 1 has five modes of automatic operation plus one preliminary manual setting operation. For uniformity in description, this preliminary setting operation has been designated "mode 1" and the five automatic operating modes have been designated "modes 2 to 6." The number of each mode corresponds to the associated fixed contact of switch 24. The operation of each mode will now be explained in detail.

Mode 1.—Manual temperature set and manual reset

Shaft 28 of selector switch 24 is rotated so that each moving contact 26a, 26b, 26c, and 26d contacts fixed contact 1 in the respective banks. To moving contact 26a is applied a voltage from battery 92 thereby establishing a current flow path through rheostat 94 and resistor 15. Adjustment of rheostat 94 establishes the set point of temperature controller 16 and a constant temperature is maintained in chamber 17 by operation of the temperature controller. Since mode 1 is normally used in readying the apparatus for subsequent automatic operation, a circuit for manually resetting the apparatus is provided from power terminal 78 through contacts 90a and through moving arm 26c to reset relay 76. Upon operation of reset button 90, reset relay 76 operates to close contact 76c to energize relay 80 through moving contact 26d. This action causes battery 14a to provide the reset current for the solion.

Mode 2.—Hold temperature

Mode 2 is used primarily to interrupt the operation of the apparatus whereby the temperature within chamber 17 at the time of interruption is maintained. When selector switch 24 is moved to the "2" position, the read-out terminal of solion 12 is connected through moving contact 26a to resistor 15 and the magnitude of current flowing therethrough determines the set point of temperature control 16. Since terminal 2 of each fixed contact in banks 24b, 24c, and 24d is open, battery 22 is not connected to solion input terminal I and stepper switch 30 is inoperable. Because no input signal is applied to the solion, the output thereof will remain constant, as a consequence of which the temperature in the chamber 17 will remain constant until manually reset by movement of switch 24 to the "1" position and operation of reset button 90.

Mode 3.—Programmed signal followed by constant level output after preselected elapsed time Mode 3 is selected by moving contacts 26 of the selector switch into contact with fixed contacts 3 in banks 24. In bank 24a the solion read-out current is connected to the temperature controller through arm 26a. Battery 22 is connected to solion input terminal I through conductor 21 and moving arm 26b after actuation of relay 68 to close normally open contacts 68b. Relay 68 is actuated from power terminal 78 through normally closed contacts 76a and through contacts 79a of start button 79. In typical operation, start button 79 is not depressed until the temperature in chamber 17 has reached a preselected level as sensed by circuit 72 and indicated by lamp 70. When the lamp is illuminated, indicating that the desired temperature has been reached start button 79 is depressed thereby energizing the coil of relay 68 and completing the circuit from battery 22 to solion 12 through contact 68b. Relay 68 is locked in the energized position through its own contacts 68a and through contact 76a to power terminal 78. Through the same circuit input terminal 66T of interval timer 66 is energized thereby commencing operation of stepping switch 30.

Preparatory to operating the system in mode 3 plugs 50 with appropriate resistors therein are inserted into selected jacks 42. To secure the input signal depicted in FIGURE 2a, a plug having a resistor therein of intermediate valve is placed in jack $42_1$, a plug having therein a resistor of relatively low value is placed in rack $42_2$ and a plug having a resistor of relatively high value is placed in jack $42_4$. In the example of FIGURE 2a, the input current of the solion is interrupted concurrently with the termination of the fourth time interval; such interruption is attained by setting moving contact 84b on fixed contact 4 of bank 84a.

The first pulse fed to stepper coil 38 by timer 66 moves wiper arm 34a to contact 1 of stepping switch bank 32a, thereby establishing a patch from ground through jack $42_1$, and the plug and resistor therein, and through wiper arm 34a to battery 22. Such current is indicated at 100 in FIGURE 2a. Since solion 12 functions as an integrator, a steadily increasing signal is fed into temperature controller 16, such signal being designated at 100a in FIGURE 2b. The temperature in chamber 17 thereby increases in accordance with the increasing signal. After a preselected interval has elapsed, as determined by the setting of control 66c on timer 66, the timer energizes stepper coil 38 and causes wiper arm 34a to advance to contact 2 on stepping switch bank 32a. The resistor in a plug 50 in jack $42_2$ is now switched into the solion input circuit; because such resistor has a lower value, a higher write current is conveyed to the solion. Such current is indicated at 102 in FIGURE 2a. A high solion write current produces a read current from terminal R with a greater rate of increase, or a geater slope. Such current is designated 102a in FIGURE 2b. At the termination of the second time interval stepper coil 38 is again actuated and moving arm 34a is connected to contact 3 in bank 32a of the stepping switch. In the example chosen for illustration, jack $42_3$ is vacant. Therefore, the solion input current flow patch is still through the resistor in jack $42_2$ since contact 48 of plug $42_3$ is connected to tip connection 46 of that plug which in turn is connected to terminal 3 in bank 32a. Thus, the magnitude of solion write for the third time interval remains constant, as is evident from FIGURES 2a and 2b.

Moving arm 34a is moved to contact 4 in bank 32a at the beginning of the fourth interval through cooperation of interval timer 66 and stepping coil 38. Because a relatively high resistor is connected into jack 42₄ the solion write current decreases to a relatively low value, as at 104 in FIGURE 2a. Since a plug is disposed in jack 42₄, tip connection 46 of that jack is not connected to contact 48 as a consequence of which only the resistor in plug 42₄ determines the solion input current. At 104b in FIGURE 2b solion output current is shown to be increasing at a relatively smaller rate, due to the relatively smaller value of the input current. Therefore, the temperature in chamber 17 is increasing during the fourth interval at a proportionately smaller rate.

It is to be understood that during each of the aforedescribed time intervals the appropriate lamp 64 is illuminated to afford an indication of the portion of the program in which the apparatus resides. At the initiation of the fifth time interval moving arm 34b is moved to contact 5 on bank 32b. It is to be understood that contacts 5 through n are provided with neon lamps 5 through n. It is to be further understood that selector switch 84 has an equal number of fixed contacts in bank 84a, each being connected to a fixed contact in bank 34a. Therefore, when moving arm 34b contacts fixed contact 5, power is applied to fixed contact 4 in bank 84a and therefore to moving contact 84b. Such power is conducted through contact 3 in bank 24c to moving contact 26c and thence to the coil of relay 76. The energization of relay 76 opens normally closed contacts 76a, which interrupts the current flow to the coil of relay 68 through contacts 68a. Consequently, relay 68 releases and the input current to solion 12 is interrupted by opening of contacts 68b. The solion input current is zero and the solion output current assumes a constant level designated at 106 in FIGURE 2b. Such constant current signal maintains the set point to temperature controller 16 at a constant level thereby maintaining a constant temperature within chamber 17. When it is desired to reduce the temperature in chamber 17 to room temperature, selector switch 24 is moved back to mode 1 where operation of reset button 90 grounds the solion input and thereby reduces the solion output to zero.

*Mode 4.—Programmed signal followed by reset after preselected elapsed time*

The operation in mode 4 is similar to mode 3 with one exception, namely, that at the end of a preselected time interval the solion output is reset to zero as a consequence of which the controller will allow the temperature within chamber 17 to fall to its initial temperature. The system is readied for operation in mode 4 by moving selector switch 24 to a position at which each moving contact 26 is connected to contact 4 in the respective banks 24. Assuming the same resistor values in jacks 42₁, 42₂, and 42₄ as described above in connection with mode 3, the input current to solion 12 will be identical. This condition is depicted in FIGURE 3a. As described above in connection with mode 3, when stepping switch 30 moves to the fifth position, relay 76 is energized to open the path of input current to the solion. In mode 4 energization of relay 76 in addition closes normally open contact 76c thereby applying current through moving contact 26d to relay 80. Relay 80 is initially locked into an energized position through its own contacts 80c and through contact 82a of relay 82. In addition, input terminal 1 of the solion is grounded through contacts 80b. Grounding of the input terminal reverses the current flow in the solion as a consequence of which the output current is reduced to zero, a phenomenon shown at 108 in FIGURE 3b. After sufficient time has elapsed for the restoration of solion 12 to a neutral condition (i.e., forty-five seconds) relay 82 operates to open contacts 82a as a consequence of which relay 80 is released and the system readied for another program.

*Mode 5.—Programmed signal followed by constant level output after preselected temperature is attained*

The system is readied for operation on mode 5 by moving selector switch 24 to a position wherein moving contacts 26 are in contact with fixed contacts 5 in bank 24. In mode 5 the solion output current increases in accordance with any desired program until a preselected temperature in chamber 16 is attained, after which the temperature in the chamber is maintained constant. To illustrate the versatility of the present invention a different program will be used to explain system operation in mode 5. A plug 50 having a resistor therein of intermediate value is inserted into jack 42₁, a plug 50 having an open circuit between the tip and sleeve thereof is inserted into jack 42₂ (i.e., infinite resistance), a plug having a relatively low resistance is inserted into jack 42₃, and a plug 50 having therein a resistance of relatively high value is inserted into jack 42₄. Obviously, additional plugs 50 of various values can be inserted into succeeding jacks up to jack 42ₙ.

The commencement of system operation in mode 5 is similar to that described in connection with mode 1 in that lamp 70 affords a visual indication of system readiness. As in mode 1 the program is initiated by depressing start button 79 thereby to apply power from power terminal 78 to the coil of relay 68 through contacts 79a and 76a. Thus, the circuit from battery 22 to input terminal I is completed through contact 68b and moving contact 26b, and interval timer 66 is energized through contact 68a. The input current during the first interval is determined by the resistor associated with jack 42₁ as exemplified at 110 in FIGURE 4a. Such input or write current is integrated by solion 12 to produce a linearly increasing read out current as at 110b in FIGURE 4b. At the initiation of the second time interval, wiper arm 34a of stepping switch 30 moves to fixed contact 2 in bank 32a. Since an open plug 50 is in place in jack 42₂, the current path to input terminal I is opened, a condition designated at 112 in FIGURE 4a. With zero write current, the read-out current from solion 12 remains constant, as at 112b, FIGURE 4b. When wiper arm 34a moves to contact 3 at the beginning of the third interval the relatively low resistor associated with jack 42₃ permits a relatively high input current into the solion, which current is shown at 114, as a consequence of which the rate of increase of read out current from the solion is increased. Such rate is illustrated at 114b, FIGURE 4b. The succeeding time interval produces a relatively low solion write current 116 and a consequent gradual rate of change in solion read out current 116b.

When the temperature in chamber 17 reaches a preselected temperature as established by control 86b and sensed by thermocouple 88, circuit 86 generates a pulse for energizing relay 76 which pulse is conveyed to the coil of the relay through moving contact 26c. Operation of relay 76 opens contacts 76a which interrupts the current flow of the coil of relay 68 through contacts 68a. Therefore, the latter relay releases and opens contacts 68b, and consequently opens the input circuit to solion 12. Zero input current to the solion is indicated at 118 at FIGURE 4a and the resultant constant solion read current is indicated at 118b of FIGURE 4b. When return to ambient conditions is desired, the system is restored by moving selector switch 24 to position 1 and by depressing push button 90.

*Mode 6.—Programmed temperature increase followed by reset to zero after attainment of preselected temperature*

The operation of the system in mode 6 is substantially identical to that in mode 5 except that when a preselected temperature is attained in chamber 17, the temperature therein is reset to the starting temperature by grounding the solion input to reduce solion output to zero. Let it be assumed that the same configuration of plugs 50 are inserted into jacks 42 as in the exemplary program described above in connection with mode 5. As a consequence of such assumption the solion write current shown in FIGURE 5a will be identical. Operation in mode 6 is effected by moving selector switch 24 to position 6. When the preselected temperature is determined by control 86b is reached, relay 76 is actuated through moving contact 26c and the solion input current path opened as in mode 5 above. Actuation of relay 76 also closes contact 76c to connect power through moving contact 26d and contact 6 in bank 24d and relay 80. Relay 80 now operates in the solion input and thereby restores the solion to a neutral condition. Such restoration causes solion read out current to decrease to zero as shown at 120 in FIGURE 5b.

Referring to FIGURE 7 a double-pole double-throw switch 98 is shown for reversing the polarity and battery 22 and therefore the direction of current flow into solion input I. Operation of switch 98 to reverse the polarity and connect the negative battery terminal to conductor 23 and the positive terminal to conductor 21 causes the solion read out current to decrease with time rather than increase. Therefore, programming signals for controllably decreasing the temperature in chamber 17 can be produced by the present apparatus, by operation of switch 98.

Thus, we have provided a tempearture programmer by which the temperature in the chamber can be varied in virtually any desired time-magnitude polarity relationship by insertion of plugs 50 with different value resistors therein and by varying the period between successive pulses from timer 66. The invention permits termination of the program after either a preselected time or attainment of a preselected temperature. In addition, the system provides modes of operation in which at termination of the program, temperature in the chamber can be either maintained constant or reset to ambient temperatures. We have thereby provided in one relatively uncomplex system a large variety of operating modes to the end that any practicable temperature-time program can be generated.

While one embodiment of our invention has been shown and described, it will be obvious that other adaptations and modifications can be made without departing from the true spirit and scope of the invention.

What is claimed is:

1. Apparatus for generating a time varying signal for controlling an ambient condition regulator of the type that regulates an ambient condition in response to the amplitude of an electrical control signal fed thereto, comprising a solion constructed and arranged to provide a control signal to control the ambient condition regulator having an amplitude which is a function of the time integral of the amplitude of its input D.C. signal, D.C. signal producing means to produce a plurality of constant amplitude D.C. input signals, switching means to seqeuntially connect each of the D.C. input signals from said signal producing means to said solion, and timing means connected to said switching means operable to cause said switching means to sequence at predetermined time intervals.

2. Apparatus for generating a time varying electrical signal for controlling a temperature regulator of the type that regulates temperature in a chamber in response to the magnitude of an electrical signal fed thereto, comprising a D.C. voltage source having first and second output teriminals, a stepping switch having a plurality of fixed contacts and a moving wiper arm adapted for sequential contact with each said fixed contact, means for connecting the first terminal of said voltage source to said moving contact, means for selectively connecting resistances to preselected ones of said fixed contacts, a solion including an input terminal connected to the second terminal of said voltage source and an output terminal, means for connecting said solion output terminal to said temperature regulator, and means for actuating said stepping switch at preselected time intervals.

3. The invention of claim 2 including means associated with a preselected one of said fixed contacts for interrupting the connection of said voltage source to said solion input terminal when said moving arm contacts said preselected fixed contact.

4. The invention of claim 3 including means responsive to said interrupting means for resetting said solion, thereby reducing the current fed into said temperature controlling device to substantially zero.

5. The invention of claim 3 including means for sensing the temperature in the chamber, and means for interrupting the connection of said voltage source to said solion when said sensing means sense a temperature of preselected magnitude.

6. The invention of claim 5 including means responsive to said interrupting means for resetting said solion, thereby reducing the current fed into said temperature controlling device to substantially zero.

7. In combination with a temperature chamber and a device for regulating the temperature in the chamber at a level proportional to and responsive to an electric current signal, apparatus for generating a programmed electric current signal for controlling said temperature regulating device comprising: a solion having an input terminal, a read-out terminal, and a common terminal; means for connecting said read-out terminal to said temperature regulating device; a stepping switch for controlling said solion, said stepping switch including a plurality of fixed contacts, a movable arm, and a stepper coil for moving the arm into sequential contact with each of said fixed contacts; means including a series battery and a relay having normally closed contacts for connecting the moving arm of said stepping switch to the input terminal of said solion; a plurality of jacks each being adapted to receive a plug therein and having a sleeve connection, a tip connection and a contact connected to said tip connection when no plug is in said jack and disconnected from said tip connection when a plug is disposed in said jack, the tip connection of each jack being connected to one of said fixed contacts of said stepping switch, each said sleeve connection being connected to the common terminal of said solion and each said jack contact being connected to the tip connection of the jack preceding it; a plurality of plugs insertable in said jacks, each said plug having a sleeve and tip for contacting respective plug connections when said plug is inserted in said jack; a resistor connected between the sleeve and tip of each said plug, whereby when a plug is inserted into a jack, a path for current flow is established from a fixed contact of said stepping switch to the common terminal of said solion; means for energizing said relay to connect the moving contact of said stepping switch to the input terminal of said solion through said battery; and means responsive to said relay energizing means for actuating said stepping switch.

8. In combination with a device for controlling temperature in a chamber in response to the magnitude of an electrical signal fed into the device, apparatus for generating a time varying electrical signal for feeding to said temperature controlling device comprising a solion having an input terminal and a read-out terminal, means for connecting said read-out terminal to said temperature controlling device, a battery for providing an input current to said solion, means including a relay having a coil and a pair of normally closed contacts for connecting said battery to said solion input terminals, a plurality of resistors, means for sequentially connecting each of said resistors in series with said battery and said solion input to effect a preselectively variable current flow into said solion input terminal, means for generating a first relay coil energizing signal in response to connection by said sequential connecting means to a preselected one of said resistors, means for generating a second relay coil energizing signal in response to the existence in said chamber of a preselected temperature, and means for selectively connecting one of said relay coil energizing signal generating means to said relay coil, whereby as a consequence of the selected connection of one of said first and second signal generating means to said relay coil effected by said selective connecting means, said solion input current is interrupted after a preselected time or after attainment of a preselected temperature in said chamber.

9. The invention according to claim 8 including means responsive to energization of said relay coil for grounding the input of said solion after said relay is energized and means for selectively actuating said grounding means, whereby the solion read-out current can be reset to substantially zero upon interruption of the solion input current after a preselected time or after attainment of a preselected temperature in said chamber.

10. In combination, an ambient condition controller of the type adapted to control the condition in proportion to the amplitude of an electrical input signal, a solion responsive to a control signal for producing the input signal for said ambient condition controller having a time-magnitude value with reference to the control signal, a D.C. voltage source connected to provide said control signal, a plurality of resistors, switch means connected to sequentially switch said resistors in series with said D.C. voltage source, and timing means to advance said switch means at predetermined time intervals to establish a plurality of control signals for said solion having a preselected magnitude determined by the resistance of the resistor and sustained for an interval determined by said timing means.

11. The invention of claim 10 in combination with a plug associated with each said resistor and having a pair of terminals, each said resistor being connected across said terminals, a plurality of jacks adapted to receive said plugs therein, each said jack having first and second terminals therein for contacting the plug terminals in response to receipt of a plug by a jack, and means connecting said jack terminals to said switch means so as to sequentially switch resistors in plugs received by said jacks in series with said voltage source.

12. The invention of claim 11, including an electrical connection associated with the first terminal of each said jack, said electrical terminal being adapted to establish connection with said first jack terminal in the absence of a plug in said jack and being adapted to break said connection in response to insertion of a plug in said jack, means connecting each said electrical terminal to the first terminal of the jack preceding the particular jack with which last said electrical terminal is associated, whereby when said switch means is connected to a jack in which there is no plug, the switch means connects the resistor associated with the preceding jack in series with said voltage source.

References Cited by the Examiner
UNITED STATES PATENTS

| | | | |
|---|---|---|---|
| 1,795,753 | 3/1931 | Bonn | 236—46 X |
| 2,765,219 | 10/1956 | Shawhan. | |
| 2,871,869 | 2/1959 | Howard | 236—46 X |
| 3,043,517 | 7/1962 | Hanna | 236—46 |

ALDEN D. STEWART, *Primary Examiner.*